H. W. PECK.
CONTROL OF SYNCHRONOUS MACHINES.
APPLICATION FILED OCT 3, 1905.
995,171.
Patented June 13, 1911.
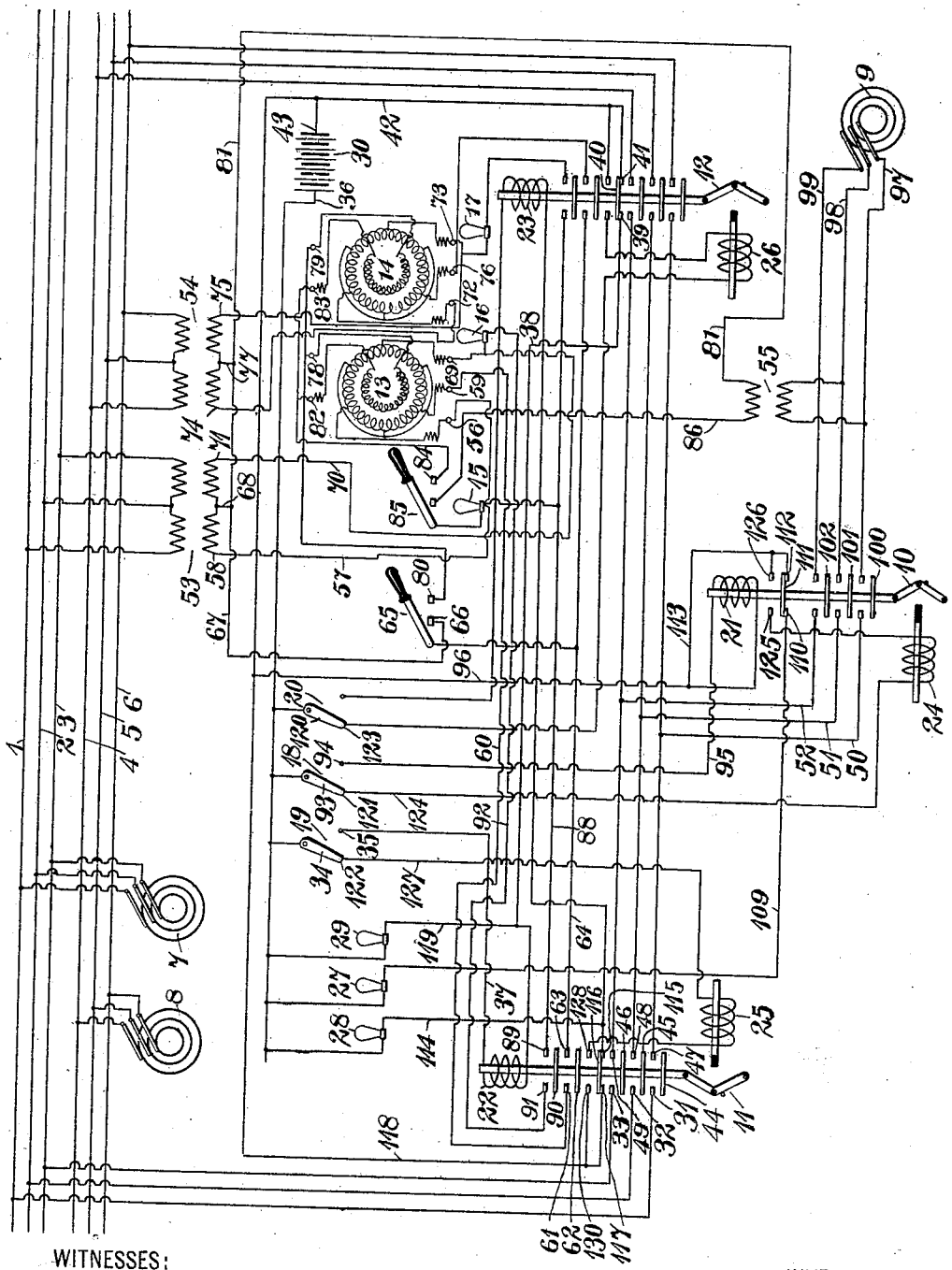
WITNESSES:
Fred. H. Miller
R. J. Dearborn.
INVENTOR
Henry W. Peck.
BY
Wesley G. Carr
ATTORNEY

UNITED STATES PATENT OFFICE.

HENRY W. PECK, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL OF SYNCHRONOUS MACHINES.

995,171.  Specification of Letters Patent.  Patented June 13, 1911.

Application filed October 3, 1905. Serial No. 281,189.

*To all whom it may concern:*

Be it known that I, HENRY W. PECK, a citizen of the United States, and a resident of Wilkinsburg, in the county of Allegheny and State of Pennsylvania, have invented a new and useful Improvement in the Control of Synchronous Machines, of which the following is a specification.

My invention relates to synchronous, alternating current electrical machines and has special reference to means for the control of a plurality of such machines which are adapted for parallel operation.

The object of my invention is to provide a controlling means that shall be simple in arrangement and that shall obviate the possibility of connecting the machine to one set of conductors while the synchronizing indicator designates synchronism with another set.

It is often desirable, particularly in relatively large electric generating plants, to employ a number of similar generators for feeding into the same line, and in order to guard against breakdown or other injuries which would render the supply circuits unfit for service, two complete and independent sets of bus-bars or conductor groups are usually employed, either or both of which may be in use at any one time. With such an arrangement, all generators should preferably be adapted for supplying energy to either set of bars and two synchronous indicators may advantageously be used, one being permanently connected with each set of bus-bars.

My invention automatically selects and renders operative the proper indicator as the generator circuit is connected to one set of bus-bars, and the circuit is finally completed, when the proper relation exists, by any convenient means, such as an electrically controlled circuit interrupter which connects said generator circuit with the collector-rings of its machine.

The single figure of the accompanying drawing is a diagrammatic view of a system in which a single synchronous machine is arranged for supplying energy to either of two groups of circuits in accordance with my invention, said groups of circuits being directly connected to a pair of supply generators.

My invention may preferably be applied to all the synchronous machines which are connected to the aforesaid groups of circuits and which may require synchronizing before they are connected thereto.

Referring to the drawing, two groups of conductors or bus-bars 1, 2, 3 and 4, 5, 6 forming alternating current transmission circuits are respectively supplied with energy from generators 7 and 8. A synchronous alternating current machine 9 may be connected with the bus-bars 1, 2 and 3 by a plurality of electrically controlled circuit interrupters 10 and 11 and may be connected to the bus-bars 4, 5 and 6 through similar circuit interrupters 10 and 12. Suitable conditions for connecting the machine 9 with the bus-bars 1, 2 and 3 and the bus-bars 4, 5 and 6 are indicated, respectively, by a pair of similar synchronizing indicators 13 and 14 and by synchronizing lamps 15 and 16 or 15 and 17. The circuit interrupters 10, 11 and 12 are respectively governed by a plurality of hand-operated, controlling switches 18, 19 and 20 and are so arranged that the closure of the circuit interrupter 11 renders the circuit interrupter 12 inoperative and the closing of the interrupter 12 renders the interrupter 11 inoperative.

The circuit interrupters 10, 11 and 12 are respectively provided with operating magnet coils 21, 22 and 23, tripping magnets 24, 25 and 26 and position indicators 27, 28 and 29, all of which are energized from any convenient electrical source, such as a storage battery 30, and are controlled by the hand switches 18, 19 and 20 and a plurality of relay switches on the main circuit interrupters.

The circuits completed through interrupters 11 and 12 are designated as branch circuits, while the circuit completed through interrupter 10 is designated as the external circuit of the machine 9 or as a supply circuit.

In order to illustrate the action of the system in any specific case, we will assume that it is desirable to connect the synchronous machine 9 to the bus-bars 1, 2 and 3, the interrupters 10, 11 and 12 occupying an open-circuit position. The interrupter 11 is provided with three contact terminals 31, 32 and 33, which are connected directly to the bus-bars 1, 2 and 3, so that it is desirable to first close this interrupter, which may be accomplished by moving the contact arm 34 of the switch 19 into engagement with a contact terminal 35. When the switch 19 occupies this position, energy is supplied from a positive terminal 36 of the battery 30, through arm 34 of the switch 19, contact terminal 35, conductor 37, operating magnet winding 22 of the switch 11, conductor 38, contact terminal 39, interrupter 12, bridging contact 40, contact terminal 41 and conductor 42, to the negative terminal 43 of the battery 30. The bridging contact 40 is in engagement with contact terminals 39 and 41 only when the interrupter 12 occupies an open-circuit position, so that the circuit may be completed through the operating magnet 22 of the interrupter 11 only when the interrupter 12 occupies such position. The energizing of the operating magnet 22 actuates the interrupter 11, moves a plurality of bridging contacts 44, 45 and 46 into engagement with the terminals 31, 32 and 33 and terminals 47, 48 and 49 and continues circuit connections from the bus-bars 1, 2 and 3, through said bridging contact, to a group of conductors 50, 51 and 52, which forms the external circuit for synchronous machine 9 and in which the interrupter 10 is located.

The synchronizing indicators 13 and 14 may be of any well known construction and are energized, respectively, from transformer groups 53 and 54, which are respectively connected to bus-bars 1, 2 and 3 and bus-bars 4, 5 and 6, and either one may be also connected with a transformer 55, the primary of which is connected to the synchronous machine 9. The aforesaid connections are completed, in detail, from a terminal 56 of the indicator 13, through a conductor 57, to one terminal 58 of the transformer 53, and from terminal 59, through conductor 60, contact terminal 61, bridging contact 62 and contact terminal 63 of the interrupter 11, conductor 64, switch 65, contact terminal 66 and conductor 67, to a common lead 68 of the transformer group 53, and from terminal 69 of the indicator 13, through conductor 70, to a terminal 71 of the transformer group 53. The terminals 72 and 73 of the indicator 14 are similarly connected to the terminals 74 and 75 of the transformer group 54, while the terminal 76 of the indicator is connected through a relay switch on the interrupter 12, to a common lead 77 on the group 54. Thus, the terminal 59 of the indicator 13 may only be connected with the common lead of the transformer group 53 when interrupter 11 is closed and, similarly, terminal 76 of the indicator 14 may only be connected with the common lead 77 of the group 54 when interrupter 12 is closed. This arrangement renders inoperative the synchronizing indicator which corresponds to the set of bus-bars that are connected through the interrupter which is open, while the indicator is active which corresponds to the set of bus-bars that are connected through the closed interrupter to the external circuit of the machine which it is desirable to connect with said bus-bars under suitable synchronous conditions.

The terminal 78 of the indicator 13 and a similar terminal 79 of the indicator 14 are connected together and through a terminal 80 of the switch 65, terminal 66, conductor 67, to the common leads 68 and 77 of the transformer groups 53 and 54, and through conductor 81 to one terminal of the transformer 55, and terminals 82 and 83 of the indicators 13 and 14, respectively, are connected together and to a terminal 84 of a switch 85, through which they are connected by a conductor 86 to the other terminal of the transformer 55.

The transformer 55 is connected through the switch 85, synchronizing lamp 15, conductor 88, contact terminal 89, bridging contact 90, contact terminal 91, conductor 92 and synchronizing lamp 16, to the terminal 71 of the transformer group 53, when the interrupter 11 is closed, but if the interrupter 12 is closed and the interrupter 11 open, the transformer 55 is similarly connected, through the lamp 15, a relay switch on the interrupter 12, and synchronizing lamp 17, to the terminal 75 of the group 54. Thus, the synchronizing lamps 15 and 16 are energized from the transformers 53 and 55 and are used in connection with the indicator 13 while the lamps 15 and 17 are energized from transformers 54 and 55 and are used in connection with the indicator 14.

When the synchronizing indicators 13 and 14 are not in use, the switches 65 and 85 should preferably be left open. Continuing with the fulfilment of the conditions which we have hereinbefore assumed, the interrupter 11 being closed, the switches 65 and 85 should be closed, thereby rendering the synchronizing indicator 13 and the synchronizing lamps 15 and 16 operative. When the machine 9 has reached synchronism with regard to machine 7 and bus-bars 1, 2 and 3, as indicated by the lamps and the indicator 13, the interrupter 10 may be closed by moving an arm 93 of the switch 18 into engagement with a terminal 94, when a circuit is completed from the positive battery terminal 36, through switch 18, conductor 95, the operating magnet 21 of the interrupter 10, and conductor 96, to the negative battery terminal 43. Energizing of the electro-magnet 21 closes the circuit interrupter 10, which completes circuit connections from a plurality of terminals 97, 98 and 99 of the machine 9, through switches 100, 101 and 102 of the interrupter 10, to conductors 50, 51 and 52, which are connected to the bus-bars 1, 2 and 3 as hereinbefore explained.

The positions of the circuit interrupters 10, 11 and 12 are indicated by the indicating lamps 27, 28 and 29, respectively, circuit connections being completed, when the interrupters are open, from positive battery terminal 36, through the lamp 27, conductor 109, terminal 110, bridging contact 111, terminal 112, conductors 113 and 96, to the negative battery terminal 43, and through lamp 28, conductor 114, contact terminal 115, bridging contact 116, terminal 117 and conductor 118, to the negative battery terminal 43 and through the lamp 29, conductor 119, conductor 38, terminal 39, bridging contact 40, terminal 41 and conductor 42, to the negative battery terminal 43, so that the lamps are lighted when their corresponding interrupters occupy the open position.

When it becomes desirable to open the circuit interrupters 10, 11 and 12, contact arms 93, 34 and 120 of the switches 18, 19 and 20 will be moved respectively into engagement with terminals 121, 122 and 123, when a circuit is completed from the positive battery terminal 36, through switch 18, conductor 124, release magnet coil 24, contact terminal 125, bridging contact 111, terminal 126, conductors 113 and 96, to the negative battery terminal, through switch 19, conductor 127, tripping magnet coil 25, terminal 128, bridging contact 116, terminal 130 and conductor 118, to the main terminal, and through switch 20, tripping magnet coil 26, and the corresponding relay switch on the interrupter 12, to the negative battery terminal. In this way, the switches 18, 19 and 20 may be left on the terminals 121, 122 and 123, since circuit is completed through the tripping coils only when the interrupters are closed, and if the interrupters are closed, the energizing of the tripping coils serves to open the circuit.

The generators 7 and 8 and any other number of synchronous machines may obviously be arranged with control circuits such as are indicated for the synchronous machine 9, the lamp 16 and the synchroscope 13 being used in connection with a lamp, peculiar to the machine, corresponding to the lamp 15 which belongs with the synchronous machine 9, for indicating synchronism between any machine and the line 1, 2, 3, while the lamp 17 and the synchroscope 14 are similarly used for indicating synchronism between any machine and the line 4, 5, 6.

Although I have shown a specific arrangement of circuit connections, I desire that all variations which do not depart from the spirit of my invention shall be included in its scope.

I claim as my invention:

1. The combination with a plurality of electric transmission circuits, a supply circuit and auxiliary apparatus for the transmission circuits, of means for selecting one of the transmission circuits for connection with the supply circuit and for rendering operative only the auxiliary apparatus connected to the circuit selected.

2. The combination with a plurality of alternating current electric transmission circuits, a supply circuit and synchronous indicators for the transmission circuits, of means for selecting one of the transmission circuits for connection with the supply circuit and for rendering operative only the indicators which are connected to the circuit selected.

3. The combination with a plurality of alternating current transmission circuits, synchronizing indicators for each circuit, and a synchronous dynamo-electric machine, of means for selecting one of the circuits for connection to the machine and for rendering operative only the indicators which are connected to the circuit selected.

4. The combination with a synchronous alternating current dynamo-electric machine, an external circuit therefor, interrupting means for the external circuit, a plurality of transmission circuits and synchronizing indicators for each transmission circuit, of means for connecting the external circuit with any one of the transmission circuits and for rendering operative only the indicators for the transmission circuit selected.

5. The combination with two alternating current electric transmission circuits, synchronous indicators therefor, a synchronous dynamo-electric machine, a three-branch circuit, and a circuit interrupting device in each branch through which the synchronous machine may be connected to either of the transmission circuits, of means for automatically preventing the closure of the interrupters to simultaneously connect the machine to both transmission circuits.

6. The combination with a synchronous dynamo-electric machine, an external circuit therefor, an electrically controlled circuit interrupter for said circuit, two sets of bus bars to which the external circuit may be connected, and synchronizing indicators for each set of bus bars, of means for connecting one set of bus bars to the external circuit, for rendering operative only the indicators which are connected to said set and for preventing the connection of the other set of bus bars to the external circuit.

7. The combination with a plurality of electric transmission circuits that are supplied with alternating current energy, synchronizing indicators for the transmission circuits, a synchronous dynamo-electric machine, an external circuit therefor, an indicator in the external circuit, branch circuits which connect the external circuits with the transmission circuits and interrupters in the branch circuits, of means dependent upon the completion of one of the branch circuits for automatically rendering operative only the synchronous indicators for the transmission circuit to which said branch circuit is connected.

8. The combination with a plurality of electric transmission circuits that are supplied with alternating current energy, synchronizing indicators for the transmission circuits, a synchronous dynamo-electric machine, an external circuit therefor, an indicator in the external circuit, branch circuits which connect the external circuit with the transmission circuits and interrupters in the branch circuits, of means dependent upon the completion of one of the branch circuits for automatically rendering operative only the synchronous indicators for the transmission circuit to which said branch circuit is connected.

9. The combination with a plurality of alternating current transmission circuits, auxiliary electrical apparatus for each transmission circuit and a supply circuit, of means comprising selective switches for each transmission circuit which are provided with interlocked switches for automatically selecting one of the transmission circuits for connection to the supply circuit and for rendering operative only the auxiliary apparatus for the transmission circuit selected.

In testimony whereof, I have hereunto subscribed my name this 29th day of September, 1905.

HENRY W. PECK.

Witnesses:
BERTRAND P. ROWE,
BIRNEY HINES.

---

Copies of this patent may be obtained for five cents each, by addressing the "Commissioner of Patents, Washington, D. C."